US008635283B2

(12) United States Patent
Vellanki et al.

(10) Patent No.: US 8,635,283 B2
(45) Date of Patent: Jan. 21, 2014

(54) TAGGING THE SEEN/NOT-SEEN STATUS OF A REAL TIME MESSAGE

(75) Inventors: Vivekanand Vellanki, Raleigh, NC (US); Durga D. Mannaru, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1746 days.

(21) Appl. No.: 10/818,227

(22) Filed: Apr. 5, 2004

(65) Prior Publication Data

US 2005/0223077 A1    Oct. 6, 2005

(51) Int. Cl.
*G06F 15/16* (2006.01)

(52) U.S. Cl.
USPC .. 709/206; 379/67.1; 379/88.12; 348/333.13; 715/867

(58) Field of Classification Search
USPC ........... 379/67.1, 88.12, 88.17; 709/245, 203; 715/65, 741, 867; 705/10; 455/412.1; 358/1.14; 348/333.13
See application file for complete search history.

(56) References Cited

U.S. PATENT DOCUMENTS

| 6,333,973 | B1 * | 12/2001 | Smith et al. | 379/88.12 |
| 6,646,657 | B1 * | 11/2003 | Rouser | 715/741 |
| 6,766,162 | B1 * | 7/2004 | Beamish | 455/412.1 |
| 6,801,603 | B1 * | 10/2004 | Arev et al. | 379/88.17 |
| 6,883,016 | B1 * | 4/2005 | Fujii et al. | 709/203 |
| 7,283,262 | B2 * | 10/2007 | Takeda et al. | 358/1.14 |
| 2001/0005859 | A1 * | 6/2001 | Okuyama et al. | 709/245 |
| 2002/0026483 | A1 | 2/2002 | Isaacs et al. | |
| 2003/0046296 | A1 | 3/2003 | Doss et al. | |
| 2003/0046354 | A1 * | 3/2003 | Mizuno | 709/206 |
| 2003/0122654 | A1 | 7/2003 | Kalinowski et al. | |
| 2005/0071214 | A1 * | 3/2005 | Kover et al. | 705/10 |
| 2005/0120306 | A1 * | 6/2005 | Klassen et al. | 715/765 |
| 2007/0165790 | A1 * | 7/2007 | Taori | 379/67.1 |

FOREIGN PATENT DOCUMENTS

WO     WO 03/034672 A1     4/2003

OTHER PUBLICATIONS

Herbsleb, James D. et al., *Introducing Instant Messaging and Chat in the Workplace*, Paper: I Think, Therefore IM, Apr. 20-25, 2002, Volume No. 4, Issue 1.

* cited by examiner

*Primary Examiner* — Dustin Nguyen
(74) *Attorney, Agent, or Firm* — Steven M. Greenberg, Esq.; Carey, Rodriguez, Greenberg & O'Keefe

(57) ABSTRACT

A method, system and apparatus for tagging the seen/not-seen status of an instant message. A method for tagging a seen/not-seen status of a real time message can include receiving a real time message and presenting the real time message through a real time communications client disposed in a host client computing device. The environmental characteristics of the host client computing device can be inspected to determine whether the real time message has likely been reviewed. As such, if it is determined that the real time message has likely been reviewed based upon the inspected environmental characteristics, the real time message can be tagged as seen.

11 Claims, 2 Drawing Sheets

TAGGING THE SEEN/NOT-SEEN STATUS OF A REAL TIME MESSAGE

BACKGROUND OF THE INVENTION

1. Statement of the Technical Field

The present invention relates to real time communications systems, and more particularly to the processing of the seen/not-seen status in a real time messaging system.

2. Description of the Related Art

Real time communications systems provide a substantial enhancement over more traditional, asynchronous communications systems. Electronic mail delivery systems, the prototypical asynchronous communications systems, in its time represented a giant leap forward in respect to global interpersonal communications. Prior to electronic mail, individuals primarily communicated via telephone, facsimile and post. With electronic mail, however, individuals expect near instant delivery of text, and even imagery, audio and video, without incurring the delay typical of the postal system, or the expense associated with telephony and fax technologies.

Despite the ubiquity of electronic mail, asynchronous communications system lack several elements common in the realm of real time communications systems. In particular, the seemingly instant delivery of a message cannot be experienced in the world of electronic mail. In an impatient society, even the minor latencies associated with electronic mail often cannot be tolerated. More importantly, often the feel and nature of a "conversation" as it is known to human beings only can be approximated through real time communications where the participants to a conversation have little time to assess a response to any portion of a message, much as is the case in a live, face-to-face conversation. Hence, the use of real time communications systems, like instant chat, instant messaging, text messaging, audio messaging, video messaging and picture sharing have begun to penetrate the communications marketplace.

In a live conversation, participants to the conversation can confirm the "receipt" of any element of a message merely by visually gauging the reaction of the other participants to the message. Where participants to a conversation communicate remotely, for example by way of the telephone, the receipt of the "message" still can be detected audibly by listening for a response to the message. In the field of asynchronous communications, however, such as facsimile or electronic mail transmissions, one can only detect the receipt of a message by the context of any response to the message, or where a "receipt" is provided by the recipient device such as a recipient mail client or by a fax machine.

Real time communications systems, unlike asynchronous communications systems, do not lend themselves well to the "receipt" system of confirming that a participant to a conversation both has received and viewed or listened to a message. In this regard, while asynchronous communications systems typically handle a low volume of message exchanges at any one moment (given the asynchronous nature of the systems), in a real time system, message exchanges occur frequently much as they do in a live conversation. To provide a continuous stream of receipt messages between participants to a conversation in a real time communications system only would serve to consume excessive human and computing resources.

Notably, in asynchronous communications, the receipt system simply verifies that a message has been received and possibly opened (though many electronic mail clients mark a message as "read" simply if the title of the message in an inbox has been selected for greater than a threshold period of time). The receipt system, however, cannot confirm whether or not a message has been read. To best simulate the flow of a live conversation in a real time communications system, however, participants to a conversation must know whether one or more of the other participants have received and reviewed the content of a message. Knowing that the message simply has been delivered will not suffice.

SUMMARY OF THE INVENTION

The present invention addresses the deficiencies of the art in respect to verifying the receipt and review of a real time message and provides a novel and non-obvious method, system and apparatus for tagging the seen/not-seen status of a real time message. A method for tagging a seen/not-seen status of a real time message can include receiving a real time message and presenting the real time message through a real time communications client disposed in a host client computing device. The environmental characteristics of the host client computing device can be inspected to determine whether the real time message has likely been reviewed. As such, if it is determined that the real time message has likely been reviewed based upon the inspected environmental characteristics, the real time message can be tagged as seen.

Preferably, the receiving step can include receiving one of an instant message, a text message, a voice message, an image, or a polling question. Additionally, the presenting step can include the step of presenting the real time message in a visual user interface. Alternatively, the presenting step can include the step of presenting the real time message in an audible user interface.

The inspecting step can include inspecting a position of the visual user interface in a display of the host client computing device. Similarly, the inspecting step can include inspecting the state of the visual user interface in a display of the host client computing device. The inspecting step yet further can include determining whether the host client computing device is locked, whether the host client computing device is in power savings mode, or whether the host client computing device is in screen saver mode.

In another aspect of the invention, the inspecting step further can include the step of audibly monitoring sounds proximate to the host client computing device to determine whether the real time message likely has been reviewed. Also, the inspecting step further can include the step of tracking an end user's eyes to determine whether the real time message likely has been reviewed.

In a preferred aspect of the invention, the method can include posting an acknowledgment to a sender of the real time message if it is determined that the real time message has likely been reviewed. In contrast, if it is not determined that the real time message has likely been reviewed, the real time message can be tagged as not seen.

Additional aspects of the invention will be set forth in part in the description which follows, and in part will be obvious from the description, or may be learned by practice of the invention. The aspects of the invention will be realized and attained by means of the elements and combinations particularly pointed out in the appended claims. It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute part of this specification, illustrate embodiments of the invention and together with the description, serve to explain the principles of the invention. The embodiments illustrated herein are presently preferred, it being understood, however, that the invention is not limited to the precise arrangements and instrumentalities shown, wherein.

DETAILED DESCRIPTION OF THE PREFERRED EMBODIMENTS

The present invention is a method, system and apparatus for tagging the seen/not-seen status of a real time communication. In accordance with the present invention, the environmental state of a computing system hosting a real time communications client can be inspected to ascertain whether a real time message has been received and reviewed. A real time message can include, but is not limited to instant messages, text messages, and audible messages, to name a few. By review it is meant that the recipient has viewed the contents of the message, either visually in the case of textual content, or audibly in the case of audible content, or both visually and audibly in the case of audiovisual content.

Figure 1:
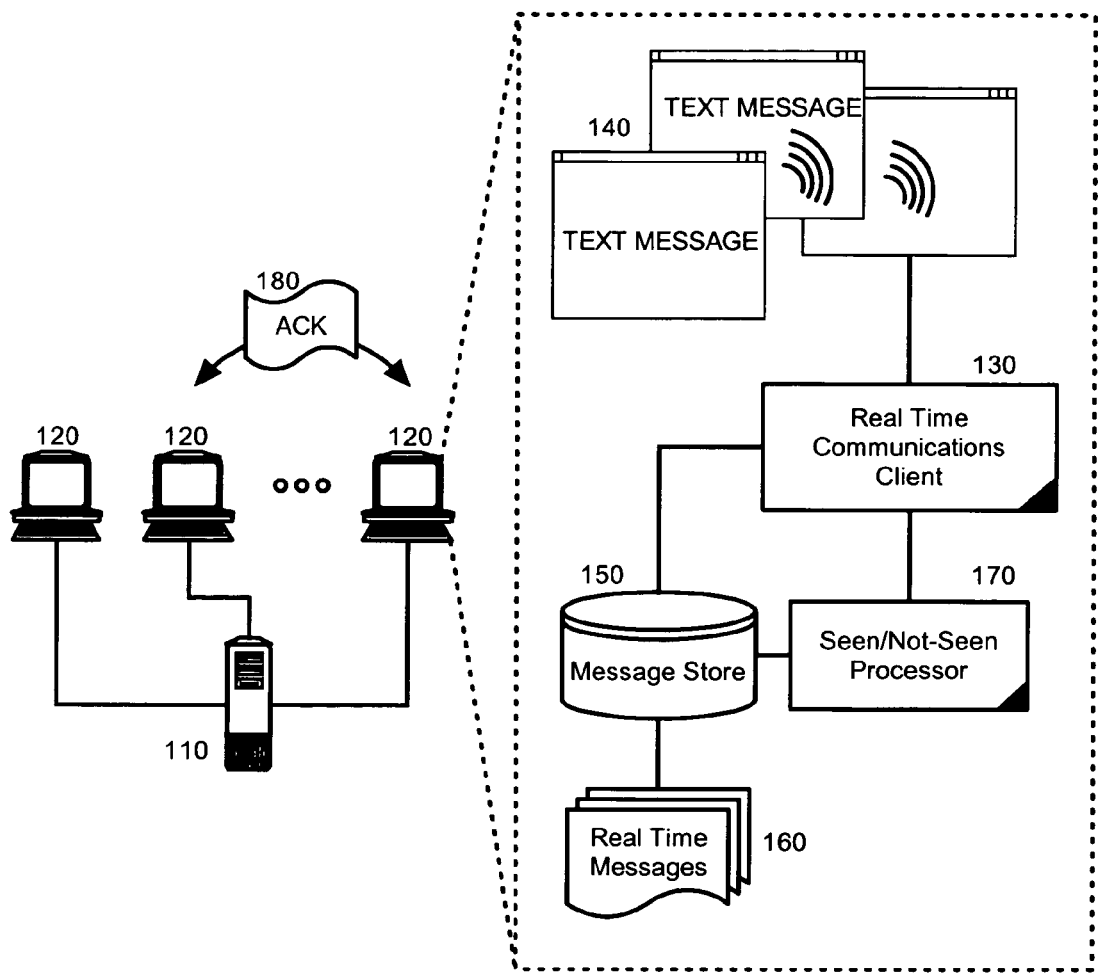
FIG. 1 is a schematic illustration of a real time communications system which has been configured in a preferred aspect of the present invention; and, FIG. 2 is a flow chart illustrating a process for tagging the seen/not-seen status of a message in the real time communications system of FIG. 1.

In more particular illustration of the foregoing invention, FIG. 1 is a schematic illustration of a real time communications system which has been configured in a preferred aspect of the present invention. The real time system can include a real time communications server 110 supporting one or more real time communications clients 130 within host client computing devices 120. The real time communications server 110 can include, for instance, an instant messaging server, a chat server, a text messaging server, and the like. The real time messages exchanged through the real time communications server 110 can include messages containing imagery, purely textual content, purely audible textual content, or mixed textual and audible content.

Each real time communications client 130 disposed within a host client computing device 120 can be coupled to a message store 150 in which one or more received real time messages 160 can be referenced, stored and maintained. As each real time message is received in the host client computing device 120, the real time communications client 130 can store the received real time message 160 in the message store 150 and the real time communications client 130 can render the received real time message 160 through the user interface 140 for review by the end user. Notably, the user interface 140 can include not only a visual user interface such as a windowing operating system, but also the user interface 140 can include an audible user interface such as that facilitated by text-to-speech processing and voice recognition technologies as is well known in the art.

Importantly, the real time communications client 130 can be further coupled to a seen/not-seen processor 170. The seen/not-seen processor 170 can monitor the status of a received real time message from the perspective of whether the end user not only has received the real time message, but also whether the end user has likely reviewed the real time message. Again, by reviewed it is meant that the end user has likely viewed or listened to (or both) the content of the real time message. Notably, one or more environmental conditions in the host client computing device 120 can be inspected to determine whether the real time message likely has been reviewed. When it is determined that the end user has likely reviewed a received real time message, the message can be tagged as "seen" and an acknowledgment 180 can be routed to the sender of the real time message. Otherwise, the received message can be tagged as "not seen".

Figure 2:
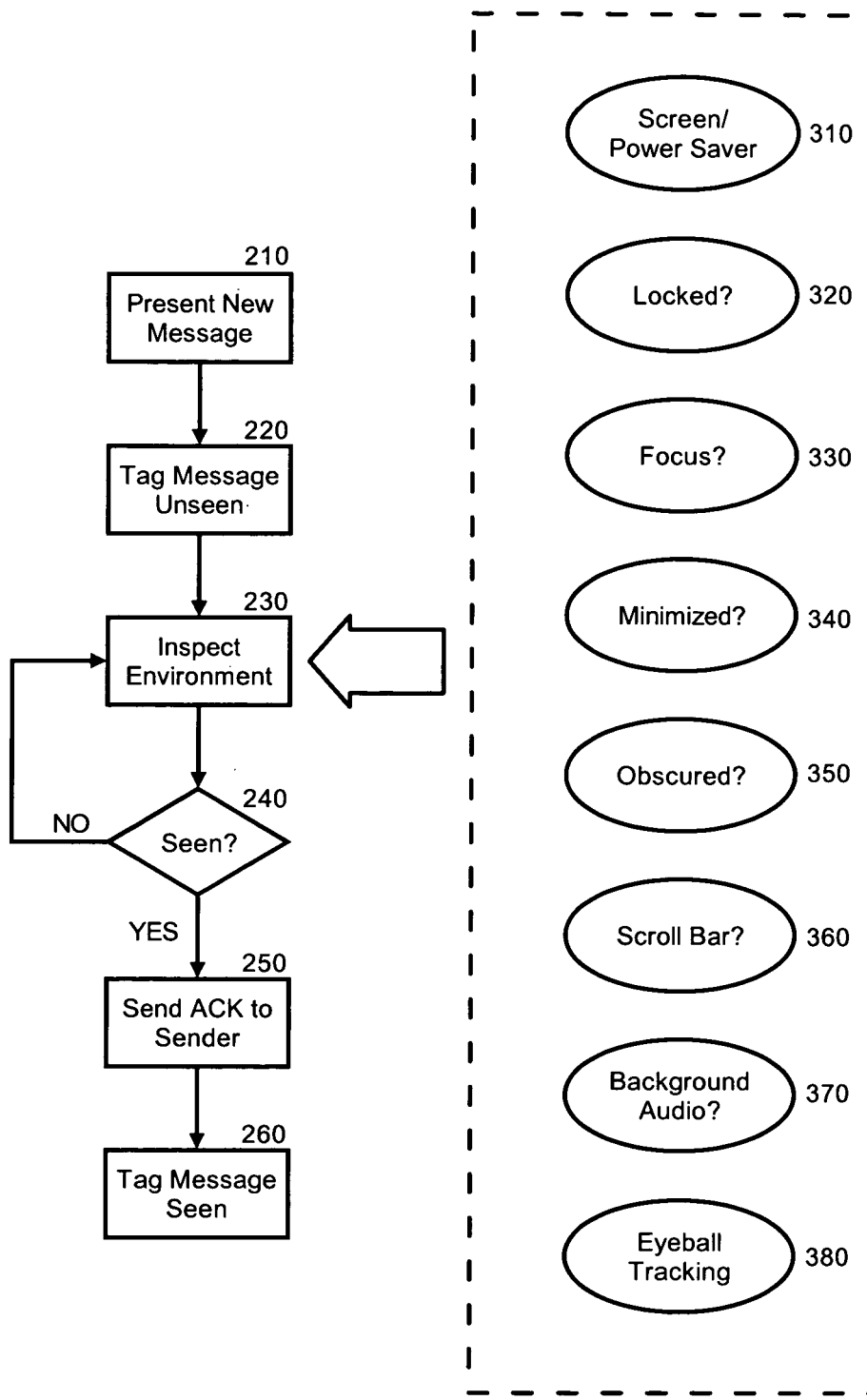

FIG. 2 is a flow chart illustrating a process for tagging the seen/not-seen status of a message in the real time communications system of FIG. 1. Beginning in block 210, a new message can be received and presented. In block 220, the message can be tagged as "unseen". In block 230, the host environment can be inspected to determine whether or not the received message has been reviewed. Specifically, state elements of the host environment, including the computing system, the operating system disposed within the computing system, the user interface to the operating system, the real time communications client and the user interface to the real time communications client can be inspected to infer whether or not the message has been reviewed. Additionally, the atmosphere in the vicinity of the computing system can be inspected to assist in the inference.

For example, in circle 310 it can be determined whether the screen saver in a visual computing environment has been activated, or whether a power savings mode has been activated due to the idle state of the host computing device. Such a state can be indicative of the absence of the end user and the inability of the end user to have reviewed the message. Similarly, in circle 320 it can be determined if the operating system has entered a locked state due to inactivity or the absence of the end user.

In circles 330, 340 and 350, the visual user interface for presenting the message can be inspected to determine if the window has been obscured by another window, minimized out of view, or whether the window lacks focus, each tending to indicate that the message cannot be viewed by an end user. Also, in circles 360, the position of the scroll bar in the visual user interface can be inspected to determine if the display has been scrolled such that the visual element presenting the message cannot be viewed on the display screen.

Several proximate environmental factors can be considered as well. For instance, in circle 370, background noise can be received through an audio input device to determine if anyone is present in proximity to the host client computing device. Silence can indicate that an end user is not available to review a message. Conversely, extreme noise can indicate a crowded room in which the end user may be distracted, albeit present. Finally, in circle 380, well-known eyeball tracking technologies can be applied to determine if the end user is looking at a visual interface element presenting the message.

Applying these environmental factors, a determination can be made whether or not the message has been reviewed. The determination can be made by summing the result of each environmental factor considered, by weighting certain factors, or by relying on a threshold number of factors, or merely one or a few factors. In any case, in decision block 240, if it is determined that the message has not been viewed, the process can return to block 230 in which the environmental factors can be continually monitored. Otherwise, if in decision block 240 it is determined that the message has been reviewed, in block 250 an acknowledgment can be sent to the sender of the message and in block 260 the message can be tagged as "seen". The process of inspecting and evaluating one or more environmental factors and tagging messages as "seen" where appropriate subsequently can repeat for each message received and presented in the user interface which has not yet been tagged as "seen".

It will be recognized by the skilled artisan that the foregoing process of tagging received real time messages as "seen" or "not seen" does not represent the exclusive process for doing so and any number of combinations of steps can be applied in order to suitably evaluate environmental conditions to determine whether a message has likely been reviewed by a recipient. Moreover, the environmental factors considered herein only represent a handful of possible environmental factors, others of which will be apparent to the skilled artisan.

The present invention can be realized in hardware, software, or a combination of hardware and software. An implementation of the method and system of the present invention can be realized in a centralized fashion in one computer system, or in a distributed fashion where different elements are spread across several interconnected computer systems. Any kind of computer system, or other apparatus adapted for carrying out the methods described herein, is suited to perform the functions described herein.

A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which, when loaded in a computer system is able to carry out these methods.

Computer program or application in the present context means any expression, in any language, code or notation, of a set of instructions intended to cause a system having an information processing capability to perform a particular function either directly or after either or both of the following a) conversion to another language, code or notation; b) reproduction in a different material form. Significantly, this invention can be embodied in other specific forms without departing from the spirit or essential attributes thereof, and accordingly, reference should be had to the following claims, rather than to the foregoing specification, as indicating the scope of the invention.

We claim:

1. A method for tagging a seen/not-seen status of a real time message, the method comprising the steps of:
   receiving a real time message;
   presenting said real time message through a real time communications client disposed in memory of a host client computing device;
   inspecting whether or not said host client computing device is in a power savings mode or a screen saver mode to determine whether said real time message has not been reviewed; and,
   upon determining that said real time message has not been reviewed, tagging said real time message as not seen.

2. The method of claim 1, further comprising the step of posting an acknowledgment to a sender of said real time message if it is determined that said real time message has been reviewed.

3. The method of claim 1, wherein said receiving step comprises the step of receiving one of an instant message, a text message, a voice message, an image, or a polling question.

4. The method of claim 1, wherein said presenting step comprises the step of presenting said real time message in a visual user interface.

5. The method of claim 1, wherein said presenting step comprises the step of presenting said real time message in an audible user interface.

6. A system for tagging a seen/not-seen status of a real time message comprising:
   a real time communications system client disposed in memory of a host client computing device; and,
   a seen/not-seen processor coupled to said real time communications system client, said processor comprising program code executing in the memory of the host client computing device, inspecting whether or not said host client computing device is in a power savings mode or a screen saver mode to determine whether a real time message in the real time communications system client has not been reviewed and upon determining that said real time message has not been reviewed, tagging said real time message as not seen.

7. A machine readable storage medium having stored thereon a computer program for tagging a seen/not-seen status of a real time message, the computer program comprising a routine set of instructions which when executed by a processor of a machine causes the machine to perform the steps of:
   receiving a real time message;
   presenting said real time message through a real time communications client disposed in memory of a host client computing device;
   inspecting whether or not said host client computing device is in a power savings mode or a screen saver mode to determine whether said real time message has not been reviewed; and,
   upon determining that said real time message has not been reviewed, tagging said real time message as not seen.

8. The machine readable storage of claim 7, wherein the computer program comprises further instructions for causing the machine to perform the step of posting an acknowledgment to a sender of said real time message if it is determined that said real time message has been reviewed.

9. The machine readable storage of claim 7, wherein said receiving step comprises the step of receiving one of an instant message, a text message, a voice message, an image, or a polling question.

10. The machine readable storage of claim 7, wherein said presenting step comprises the step of presenting said real time message in a visual user interface.

11. The machine readable storage of claim 7, wherein said presenting step comprises the step of presenting said real time message in an audible user interface.

* * * * *